United States Patent [19]

McCarthy et al.

[11] 4,207,179
[45] Jun. 10, 1980

[54] BIOTREATMENT USING CARBON TREATED RECYCLE AND/OR CLARIFIER EFFLUENT BACKWASH

[75] Inventors: William C. McCarthy; Howard W. Goard, both of Bartlesville, Okla.

[73] Assignee: Phillips Petroleum Company, Bartlesville, Okla.

[21] Appl. No.: 826,596

[22] Filed: Aug. 22, 1977

Related U.S. Application Data

[63] Continuation-in-part of Ser. No. 709,368, Jul. 28, 1976, abandoned.

[51] Int. Cl.² .................................................. C02C 1/06
[52] U.S. Cl. .......................................... 210/7; 210/8; 210/17; 210/18
[58] Field of Search ................... 210/3, 6, 8, 17, 18, 210/7, 40, 80, 82

[56] References Cited

U.S. PATENT DOCUMENTS

| | | | |
|---|---|---|---|
| 1,254,836 | 1/1918 | Mulloy | 210/8 |
| 2,529,295 | 11/1950 | Hood | 210/8 |
| 3,269,542 | 8/1966 | Renzi et al. | 210/8 |
| 3,730,881 | 5/1973 | Armstrong | 210/8 |
| 3,869,380 | 3/1975 | Torpey | 210/17 |
| 3,928,190 | 12/1975 | Bebin | 210/17 |
| 4,081,365 | 3/1978 | White et al. | 210/18 |

FOREIGN PATENT DOCUMENTS

2447956  4/1975  Fed. Rep. of Germany ............ 210/18

Primary Examiner—Thomas G. Wyse

[57] ABSTRACT

In a process for biotreating industrial waste water, a portion of the effluent is treated with activated carbon and recycled to the biotreater. This results in a substantial improvement in the biotreater performance. In another embodiment, the biotreatment is an activated sludge process and the clarifier effluent is filtered to stop loss of bacteria and periodically the filter is backwashed to return the bacteria to the system.

18 Claims, 4 Drawing Figures

BIOTREATMENT USING CARBON TREATED RECYCLE AND/OR CLARIFIER EFFLUENT BACKWASH

CROSS-REFERENCE TO RELATED APPLICATION

This is a continuation-in-part of copending application Ser. No. 709,368, filed July 28, 1976, now abandoned.

BACKGROUND OF THE INVENTION

This invention relates to a process for treating waste water from industrial sources. In a more specific aspect, this invention relates to a process for treating waste water having a relatively high chemical oxygen demand (COD) caused by organic material which is predominantly soluble in water.

It is well known in the art to use a biochemical treatment step for treating municipal sewage. Use of biochemical treatment is also known for waste water from chemical plants as evidenced by Hudson, Jr. et al, U.S. Pat. No. 3,646,239.

Waste water from chemical plants generally differs substantially from municipal sewage in that it contains a higher concentration of organic matter and, in addition, this organic matter is predominantly soluble whereas in municipal sewage the organic matter is predominantly solids. The high concentration of organic matter in waste water from chemical processes makes the treatment of this water extremely difficult. For instance, in a municipal sewer plant, chemical oxygen demand may be no more than 300 to 400 milligrams per liter and a 90 percent reduction leaves the effluent within generally accepted standards, whereas with waste water from a chemical plant which may have a chemical oxygen demand of 2500 or more, a 90 percent reduction leaves the effluent still unsuitable for disposal in view of current Federal specifications requiring waste water to have a maximum COD of approximately 200 and a maximum BOD (biological oxygen demand) of approximately 20 before discharge into a river or pond.

Accordingly, when high COD industrial wastes are to be treated, it is frequently necessary to supplement biotreating with another process such as chemical treatment, stripping, or adsorption.

Another problem encountered in biotreating industrial wastes is that these wastes may contain chemicals which are toxic to the microorganisms. The presence of such substances retards the activity of the microorganisms and reduces their population. The result is gradually poorer biotreater performance and unacceptable BOD and COD levels in the effluent. Known methods for overcoming the problem include (1) identification and elimination of the toxins, (2) dilution of the biotreater feed to lower toxin concentration to an acceptable level, and (3) pretreating the feed in some manner such as by carbon adsorption. These methods, however, have serious disadvantages. The first may be too expensive and it may be virtually impossible to identify and eliminate the toxins; the second is also costly and may be unacceptable to Government authorities since it increases the volume of the waste stream; and the third, while effective, is also costly in that the carbon beds become loaded rather rapidly, necessitating frequent regeneration and makeup of carbon. The use of carbon to "polish" all of the final effluent prior to discharge is also known, but this can be even more expensive than the use of carbon to pretreat waste water.

SUMMARY OF THE INVENTION

It is an object of this invention to provide a process suitable for treating industrial waste water;

it is a further object of this invention to provide a process for treating waste water having a high chemical oxygen demand generated by organic material which is predominantly soluble;

it is yet a further object of this invention to provide a process for treating waste water involving the use of a conventional activated sludge process;

it is still yet a further object of this invention to provide an economical process for treating waste water from an oxidative dehydrogenation process;

it is an object of one embodiment of this invention to provide a process for treating waste water involving the use of activated carbon which makes efficient use of the carbon;

it is still a further object of this invention to produce water having a COD of 200 or less and a BOD of 20 or less;

it is still yet a futher object of another embodiment of this invention to treat industrial waste water without dilution or pretreatment using an activated sludge process; and it is still yet a further object of this invention to provide a process for biotreating waste water having a toxic content.

In accordance with one embodiment of this invention, industrial waste water is passed to a conventional biotreating zone and the resulting purified water is separated into at least two streams, a discharge stream and a recycle stream which is passed into contact with activated carbon and thence back into the biotreating zone as a dilution stream.

In accordance with another embodiment of this invention, industrial waste water is passed to the biological treating zone of an activated sludge system and then to a clarifier zone, the effluent from the clarifier is passed to a filtration zone and periodically the filter is backwashed to return bacteria to the system.

BRIEF DESCRIPTION OF THE DRAWINGS

In the drawings, forming a part thereof, wherein like reference characters denote like parts in various views.

DESCRIPTION OF THE PREFERRED EMBODIMENTS

Figure 1:
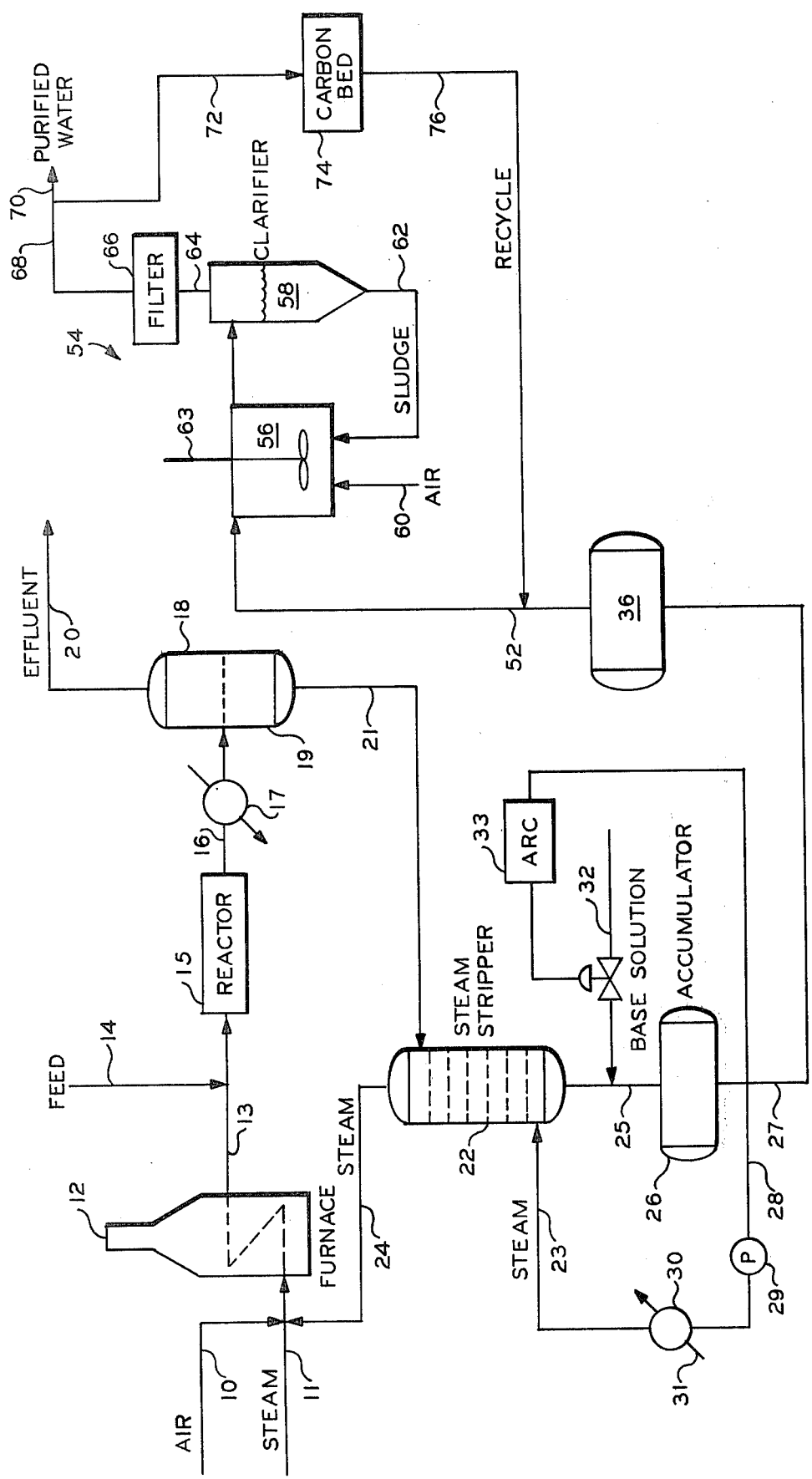
FIG. 1 is a schematic representation of a waste water treatment process in accordance with this invention.

As used herein, the term COD (chemical oxygen demand) is a measure of the oxygen equivalent of that portion of the organic matter in a sample that is susceptible to oxidation by a strong chemical oxidant. It can be expressed either in terms of milligrams per liter or in parts per million. Tests can be run in accordance with Standard Methods for the Examination of Water and Wastewater, 13th Edition, pages 495–499, American Public Health Association, Inc. (1971). BOD (biochemical oxygen demand) is a similar test measuring the oxygen requirements for biochemical oxidation of organic matter in waste water. This test is run in accordance with "Standard Methods for the Examination of Water and Wastewater", 13th Edition, pages 489–495, American Public Health Association, Inc., New York, New York (1960). As noted in detail hereinafter, the data reported herein is sometimes in SBOD and SCOD (soluble) but there is very little solid material creating an oxygen demand so the SCOD is essentially the same as TCOD and SBOD is essentially the same as TBOD. The terms COD and BOD without more refer to TCOD (total of soluble and solids) and TBOD (total of soluble and solids). As explained hereinafter, these terms are different from TOD which is the complete total of all oxygen demand for all organic matter since the test involves burning which removes all of both the soluble and solid and also more completely oxidizes so as to give a higher value than COD.

The invention is applicable to the treatment of any waste water having a relatively high COD and a relatively high percentage of the COD produced by soluble organic material and/or waste water having toxic organic ingredients. The invention is particularly applicable to waste water having a COD of 1000 or greater, preferably 2000 to 10,000 milligrams per liter. It is of particular applicability to such waste water wherein the COD is produced by organic material which is greater than 50 percent, preferably greater than 90 percent soluble. It is of particular applicability to waste water having 90 to 99 percent of the material creating the COD in the form of soluble organic matter.

The invention is of primary applicability in treating waste water from chemical plants and most particularly applicable to the purification of effluents from oxidative dehydrogenation processes.

Water effluent from a butane oxidative dehydrogenation plant contains appreciable amounts of oxygenated compounds. Hudson, Jr. et al, U.S. Pat. No. 3,646,239, the disclosure of which is hereby incorporated by reference, gives the background for such a dehydrogenation process.

The waste water is obtained from several sources in such a plant. It is generally stripped or flashed for removal of most of the volatile oxygenated compounds which are then either burned or recycled to the dehydrogenation reactor. Hinton et al, U.S. Pat. No. 3,679,764, the disclosure of which is hereby incorporated by reference, illustrates steam stripping with recycle of overhead impurities to the dehydrogenation reactor. It is also possible to strip the waste water with inert gas and then burn the overhead. In any event, the water stream to be treated in accordance with the preferred embodiment of this invention is water from a stripper or flash step that has already had many of the impurities removed.

The microorganisms for effecting the biochemical treatment can be obtained from any conventional municipal activated sludge treatment plant and conditioned simply by their presence in the effluent to be treated wherein the particular bacteria which thrive on the particular effluent will multiply and the others will die. Generally, the effective microorganisms are aerobic gram negative rod-shaped bacteria. Other known methods of obtaining the appropriate microorganisms such as from a soil sample can also be used.

The organic materials primarily being treated in accordance with this invention are aldehydes, ketones, acids, and interrelated products thereof.

Any conventional activated carbon can be utilized in the first embodiment of the invention such as for instance, Nuchar WVG 12 by 40 mesh activated carbon. The carbon can be regenerated in a manner well known in the art. The time and temperature for the activated carbon treatment of the recycle can be the same as that conventionally employed when activated carbon treatment is used as a tertiary treatment following a biochemical treatment. Generally, the treatment will be carried out at ambient temperature although temperatures within the range of 50° to 150° F. are satisfactory. The flow rate can be that which is conventionally utilized and is not critical. For instance a rate of 1 to 10 volumes of water per hour per volume of activated carbon is satisfactory. The exposure as measured in pounds of COD per pound of carbon is generally in the range of 0.1 to 1, preferably 0.2 to 0.4.

The biochemical treatment is carried out in a conventional manner as is known in the art, the second embodiment specifically being carried out in an activated sludge plant utilizing an activated sludge tank (aerator or biological treatment zone) and clarifier with sludge recycle from the clarifier to the sludge tank, as is known in the art. It will generally be carried out at ambient temperature although the temperature can vary from 40° to 150° F. (4° to 66° C.). Time of treatment from 0.2 to 10 days in hot weather and 0.4 to 20 days in cold weather is preferred although this can vary somewhat. Where space limitations are a factor, rotating biological surface units such as the Biosurf unit solid by Autotrol Corporation are suitable for use in the first embodiment of this invention.

The dilution ratio for the first embodiment of this invention is somewhat critical. Above a ratio of about 1:1 (feed:recycle) toxic constituents in the feed are sufficiently concentrated to seriously impair the biochemical treatment. Dilution in excess of the bare minimum required to counteract the effect of the toxic constituents constitutes an unnecessary waste. Accordingly, dilution ratios of 1:0.75 to 1:4, preferably 1:1 to 1:2, most preferably about 1:1, are utilized. Thus the portion recycled generally constitutes 40–80, preferably 50–67, volume percent of the clarifier effluent, the remainder being discharged without activated carbon treatment.

The filter for the second embodiment of this invention can be any granular media filter of the type well known in the art. Exemplary of such filters are those using anthracite coal on top of sand, the sand being on top of garnet. The particles become progressively smaller and heavier going from the coal in the sand to the garnet. Since this filtration of clarifier effluent is relatively easy, the filter can utilize only two of these materials or even only one. Particularly, the coal alone or sand alone can be used.

Backflushing is generally carried out fairly often so as to avoid killing the bacteria and to avoid excessive pressure drop. Generally, the backwash will be carried out once every 6 to 48 hours, preferably once every 12 to 36 hours, although shorter or longer times can be used.

Referring now to the drawings, there is shown an exemplary utility for the instant invention in accordance with the preferred embodiment thereof wherein waste water from an oxidative dehydrogenation process is treated in accordance with the invention. In the oxidative dehydrogenation system, air and steam are passed to furnace 12 by way of process lines 10 and 11, respectively, and are heated to a reaction temperature of about 1050° F. After this the combined stream is passed by way of line 13 where it is admixed with butene introduced by way of line 14 to reactor 15. The resultant mixture of air, stream and hydrocarbon feed, specifically butene, contacts a suitable dehydrogenation catalyst is zone 15 at a reaction temperature such as from about 800° to 1200° F. whereby the butene is converted at least partially to butadiene. The effluent from the dehydrogenation zone additionally contains oxygenated hydrocarbons including carbonyls. The reactant effluent comprising unreacted hydrocarbons, dehydrogenated butene, e.g., butadiene, oxygenated hydrocarbons and water is removed from the reactor by way of line 16 and passes through condenser 17 where the water is substantially condensed to produce an aqueous phase containing a predominance of the oxygenated hydrocarbons contained in the reactor effluent. The condensate is passed to collection vessel 18 wherein the aqueous phase 19 containing oxygenated hydrocarbons is accumulated and the vaporous hydrocarbon phase is removed by way of line 20 and passed to purification and collection facilities. Recycle of the condensate phase 19 containing oxygenated hydrocarbons to the dehydrogenation zone to suppress the formation of additional oxygenated hydrocarbons as well as to conserve water is, of course, desirable for economic reasons.

Aqueous phase 19 containing oxygenated hydrocarbons in zone 18 is removed by line 21 and passed to the top of steam stripper 22. Steam is introduced into the base of stripping zone 22 by way of line 23 and countercurrently contacts water descending in column 22. Column 22 can be provided with suitable packing, trays or other contact media effective for vapor-liquid contacting. The steam rising through stripping zone 22 removes a major portion of the oxygenated hydrocarbons present in the water phase introduced into the upper portion of the column. Steam and the oxygenated hydrocarbons stripped from the water phase are removed overhead from zone 22 by way of line 24 and returned to furnace 12 by introduction into steam line 11. The water phase partially stripped of oxygenated hydrocarbons is removed as bottoms from column 22 by way of line 25 and passed to kettle accumulator 26. A portion of the liquid accumulated in kettle 26 is removed and passed to retention zone 36 via line 27 and the remainder is removed by way of line 28, passed through pump 29 and through reboiler heater 30 to elevate the temperature to form steam for introduction into column 22 through line 23. The amount of stripping with steam is preferably controlled so that the amount of water equivalent to the process demand rate is vaporized and returned to furnace 12 by way of lines 24 and 11. Reboiler 30 can be heated by way of an external source of steam introduced by way of line 31, the flow rate of which can be controlled by temperature controller units sensing the temperature in the upper portion of column 22. The rate of removal of steam plus oxygenated hydrocarbons in line 24 can be controlled by a flow rate controller set to pass a certain flow rate based on the flow rate in line 11 so that a combined stream flow meeting the process demand rate is provided. The steam-stripped water phase removed from the base of column 22 can be neutralized by the addition of a base so that the heated water in reboiler 30 is substantially neutral. A base is introduced into line 25 by way of line 32. The addition of base through line 32 can be controlled by a pH meter 33 which senses the pH of water removed from accumulator 26 and adjusts the valve controlling the flow rate of base introduced.

As set out hereinabove, a portion of the liquid accumulated in kettle 26 is removed as waste water and passed to retention zone 36 via line 27 and thence via line 52 to a conventional activated sludge unit designated generally by reference character 54. Specifically, effluent from line 52 is passed into activated sludge biotreatment tank 56 for a conventional detention time of from a few hours to a few days. Effluent from tank 56 is passed to clarifier tank 58 via line 59. (See FIG. 4). A flocculent such as alum can be added to aid in settling the solids in the clarifier and if such is used, it can be added to line 59 or directly to the clarifier. The flocculent aids in settling the solids; however, one advantage of the second embodiment of this invention is that the flocculent can be omitted because of the practice of backwashing and returning the microorganisms to the system. Sludge from clarifier tank 58 is recycled via line 62 back to tank 56; this material is primarily bacteria. Air to provide oxygen is introduced into the activated sludge tank 56 via line 60. Mixing of the air with the activated sludge is effected by stirrer 63. Water having a small amount of the microorganisms entrained therein is removed via line 64 and passed to filter 66.

As shown in FIG. 1, which primarily emphasizes the first embodiment of this invention, the thus purified water is removed via line 64 and passed to filter 66. The effluent line 68 from filter 66 is divided into two lines, line 70 carrying the purified water to discharge and line 72 carrying a portion of the purified water to carbon beds 74. Effluent from carbon beds 74 is recycled by line 76 back to the biotreater. Periodically, filter 66 is backflushed so as to return any solids (predominantly bacteria) to the system so that they are not lost. Alum and other known flocculating agents can be used to accelerate sludge settling in the clarifier.

Figure 4:
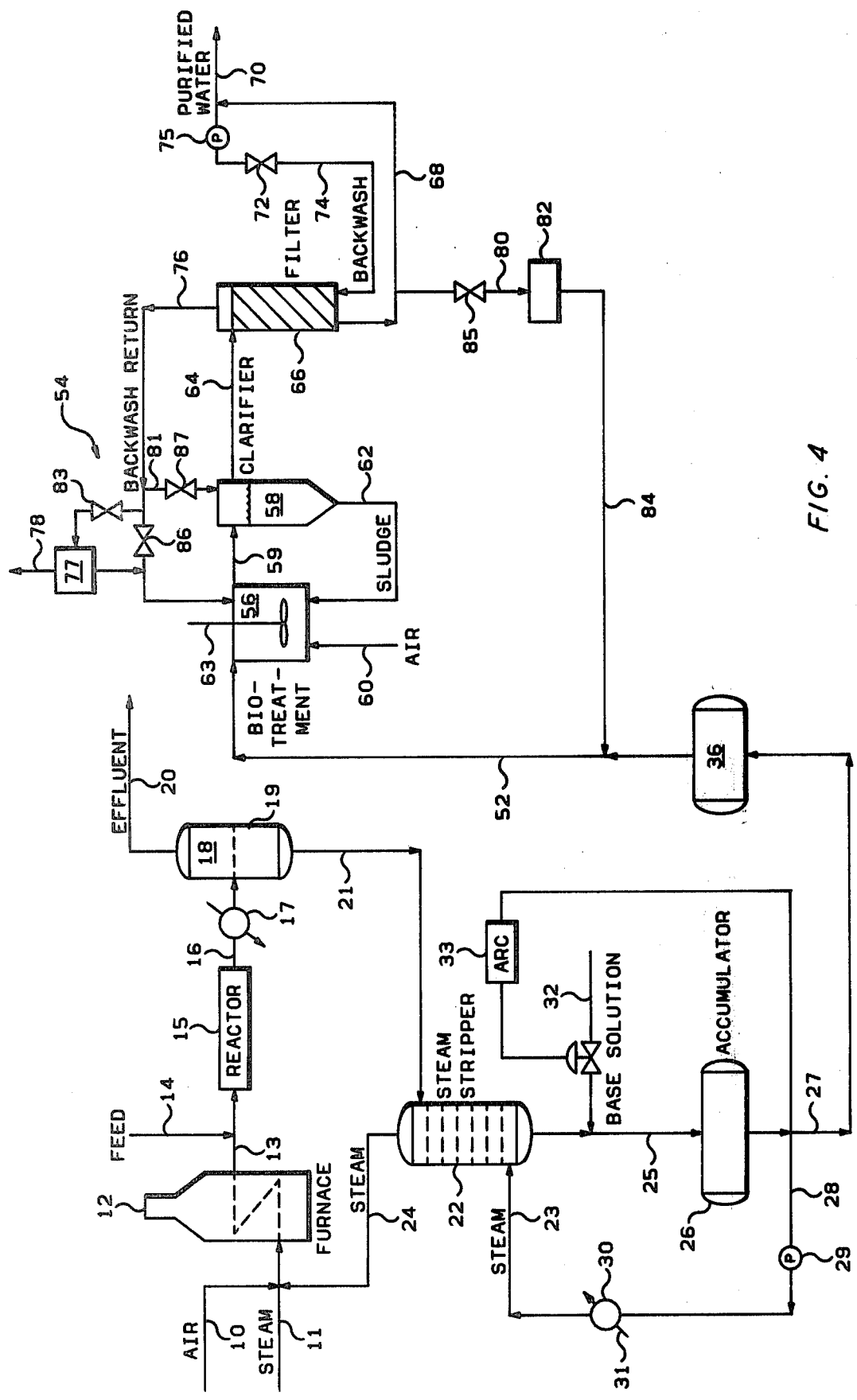
FIG. 4 is a schematic representation of a waste water treatment process emphasizing the second embodiment of this invention.

As shown in FIG. 4 which primarily emphasizes the second embodiment of this invention, purified water is removed from filter 66 via line 68 and thence to line 70 carrying the purified water to discharge. Periodically pump means 75 is activated and valve 72 opened so as to pass water via line 74 to backwash filter 66 so as to return any solids (predominantly bacteria) to the system via line 76 so that they are not lost.

The bacteria can be returned to the system by passing the backflush to the clarifier 58 via line 81 and valve 87 or to the biotreater 56 via valve 86. In the first instance, the biotreater is not diluted. In either case the backwashed bacteria are more susceptible to settling than they were initially. Another alternative is to pass the backwash to a surge tank or second clarifier 77 through valve 83 and then return the second clarifier sludge at a substantially constant rate to either the clarifier or biotreater and combine the separated water from this second clarifier, removed via line 78, with the purified water stream 70. Optionally a portion of the purified water from line 68 can be returned to biological treatment zone through valve 85, line 80, activated carbon filter 82 and line 84. Dilution ratios of 1:1 to 102 (feed:-dilution) are satisfactory, however, one of the advantages of the second embodiment of this invention in that it is not necessary to either dilute with pure water or water treated with activated carbon to remove toxins, or otherwise pretreat the industrial waste prior to its entry into the biological treatment zone.

Many conventional parts, such as temperature controllers, heating elements, valves, and the like, are not shown in the drawings for the sake of simplicity, but their inclusion is understood by those skilled in the art and is within the scope of the invention.

Examples I-IV illustrate the first embodiment of this invention and Example V illustrates the second embodiment.

EXAMPLE I

The following runs were carried out in a 5-foot diameter, 7-foot high stainless steel tank, jacketed to permit temperature control at near 80° F. (27° C.). Air was continuously introduced through three pipes discharging just below a mixer which provided good agitation of the tank contents. Discharge liquid passed from the bottom of the tank to an adjoining clarifier consisting of a 20-inch diameter, 7-foot tall vertical tank with cone-shaped bottom.

The waste water feed was derived from a butadiene plant using oxidative dehydrogenation of butenes such as shown in U.S. Pat. No. 3,646,239. Typically, the feed had an SCOD of 2240 mg/l and an SBOD of 1170 mg/l and a pH of about 3.0. Nutrients consisting of 5 parts nitrogen in the form of $NH_3$ and 1 part phosphorus in the form of $H_3PO_4$ per 100 parts by weight of SCOD in the feed water were continuously added. Caustic soda at rates up to about 5 parts per 100 parts of SCOD was also added on an intermittent basis to control treater pH at about 7.0.

Bacteria were obtained from a commercial biotreater operating in an oil refinery, using samples of recycle sludge. The bacteria were considered to be a mixed population, i.e., a mixture of strains as used in commercial biotreaters. Nalco 634, a commercial flocculating agent sold by Nalco Chemical Company was added to the clarifier to provide a concentration of 10 ppm to accelerate sludge settling.

The table below compares biotreater operation with and without feed dilution:

Table I

|  | Without Dilution | 1:1 Ratio Dilution With Steam Condensate | 1:1 Ratio Dilution With Carbon Treated Effluent |
|---|---|---|---|
| Run | 1 | 2 | 3 |
| Run Duration, weeks | 10 | 6 | 5 |
| Feed Rate, gal/hr (m³/day) | (.95) | (.55) | (.55) |
| Dilution Rate, gal/hr (m³/day) | none | (.55) | (.55) |
| Residence Time in Biotreater, days | 3.0 | 3.0 | 3.0 |
| Feed Water Composition |  |  |  |
| SCOD, mg/l | 2000 | 2100 | 2200 |
| SBOD, mg/l | 1300 | 1200 | 1400 |
| Clarifier Effluent Composition |  |  |  |
| SCOD, mg/l | 250 | 200** | 100* |
| SBOD, mg/l | 50 | 35** | 20* |
| Volatile Suspended Solids |  |  |  |
| Biotreater Liquor, mg/l | 4200 | 2400 | 2400→3200 (increasing) |
| Clarifier Effluent, mg/l | 50 | 30 | 45 |

*Average values for last two weeks of the run.
**Average values for best two weeks of the run.

The dilution water of invention Run 3 was biotreated effluent which had been passed over beds of 12×40 mesh charcoal to yield water with an average COD of about 30 mg/l.

The above data illustrate that operation without dilution was unable to produce specification (200 COD, 20 BOD) effluent. Dilution in 1:1 ratio with steam condensate yielded effluent essentially meeting COD specification only, but it is believed that a longer operating period would having permitted reaching the BOD specification (some mechanical problems were encountered). Operation with carbon-treated effluent yielded specification product (200 or less COD and 20 or less BOD) with respect to both COD and BOD (neglecting a small amount of insoluble material creating an oxygen demand which may be present). As can be seen, the use of carbon treated purified water from the biotreater as recycle to dilute the feed water is as effective, and apparently more effective, than utilizing steam condensate as diluent and offers a dual advantage of not requiring expensive steam and not increasing the total amount of water discharged.

CALCULATED EXAMPLE II

Figure 2:
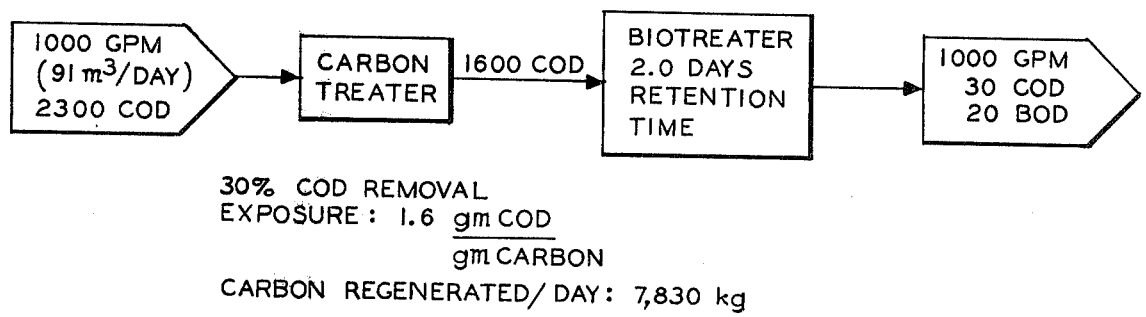
FIGS. 2 and 3 are schematic drawings of waste water treatment processes in accordance with conventional practice and the first embodiments of this invention, respectively.
Figure 3:
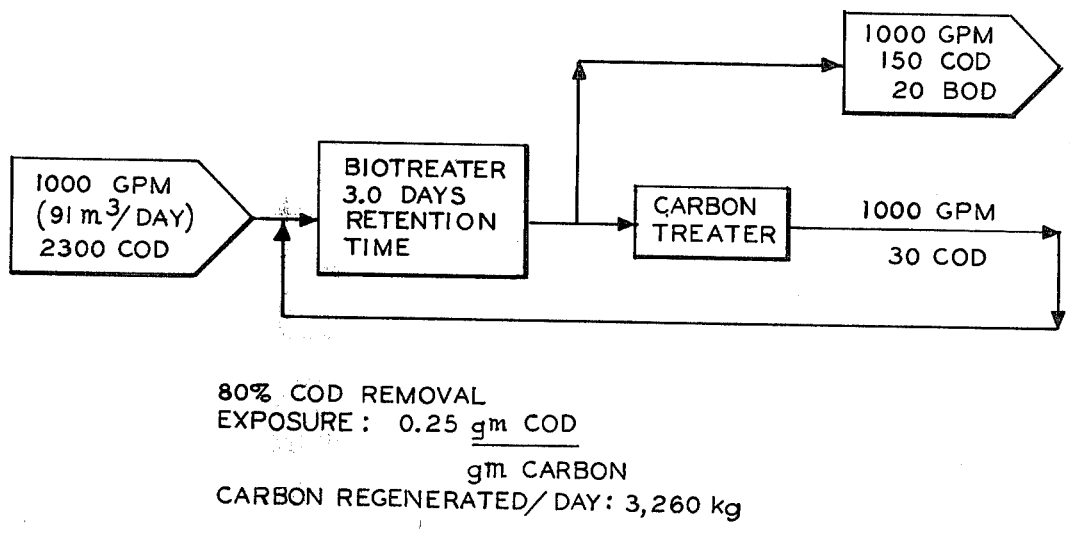

Calculated examples based on operating experience illustrates the attractiveness of the use of carbon treated recycle as compared with carbon treating biotreater feed as shown in FIGS. 2 and 3.

Thus, as shown by a comparison of FIG. 2 with FIG. 3 for producing near comparable water only about 42 percent as much carbon must be regenerated for the method using carbon treatment on the recycle portion of the effluent only. Carbon makeup into the system would be proportionately less, also. It must be borne in mind that this is a comparison between the invention as exemplified by FIG. 3 and a system as exemplified by FIG. 2 which, while the control for this invention is in itself a new development which is superior to using carbon filters to treat all of the effluent. Thus, carbon treatment of a portion of the effluent which has been returned to the biotreater is superior to either carbon treatment of all of the feed or carbon treatment of all of the effluent with no recycle.

EXAMPLE III

The following example is designed to show that a rotating biological surface unit can also be used in accordance with this invention. The following data were obtained using a pilot sized unit containing 21 square feet (1.95 m²) of surface. This surface was supplied by 18 foamed polystyrene discs 10 inches (0.254 m) in diameter which were nearly 50 percent submerged in three cells which had a total liquid volume of 8.4 l of waste water. Waste water feed was continuously supplied to the cells which were connected in series, and effluent overflowed to a collection basin.

Table II

| Run | Liquid Retention Time, days | Dilution Ratio | SCOD, mg/l Feed | SCOD, mg/l Effluent | Hydraulic Loading Gal feed/day/ft |
|---|---|---|---|---|---|
| 1 | 0.5 | 1:1 | 2188 | 188 | 0.106 |
| 2 | 0.24 | 1:1 | 2256 | 187 | 0.216 |
| 3 | 0.16 | 1:1 | 2296 | 226 | 0.33 |
| 4 | 0.32 | none | 2208 | 1488 | 0.33 |

It is apparent that all the runs using dilution (with tap water) produced superior effluents to Run 4 which used no dilution. Runs 3 and 4 are particularly comparable since each was processing raw waste water at the same rate (same hydraulic loading), yet Run 3 yielded near specification 226 SCOD effluent for about 80 percent SCOD removal while only about 33 percent of the SCOD was removed in Run 4, made without dilution. Although the rotating biological unit was not operated with carbon treated recycle, the success of the invention as shown in Example I coupled with this data establishes that similar success would attend the rotating type of unit also. In addition, operation in accordance with the invention would have the further advantage of not increasing the amount of effluent whereas the simulated tests hereinabove did increase the amount of effluent since the tap water diluent used in these tests, of course, adds to the total discharge.

EXAMPLE IV

Following is a run carried out for 26 days using OXD waste water as the feed. This is essentially a duplication of Run 1, of Example I, except that it was carried out for an extended period of time. The results are shown hereinbelow in Table III wherein TOD is total oxygen demand. Total oxygen demand is determined by burning all organic matter and gives a value slightly higher than COD.

TABLE III

| Day | Feed, TOD, mg/l | Effluent, TOD, mg/l |
|---|---|---|
| 1 | 1941 | 357 |
| 2 | | |
| 3 | | |
| 4 | 2085 | 305 |
| 5 | 2145 | 325 |
| 6 | 2130 | 320 |
| 7 | | |
| 8 | | |
| 9 | | |
| 10 | | |
| 11 | 2109 | 375 |
| 12 | | |
| 13 | 1911 | 400 |
| 14 | | |
| 15 | 1695 | 382 |
| 16 | | |
| 17 | | |
| 18 | 1815 | 480 |
| 19 | | |
| 20 | 1590 | 560 |
| 21 | 1770 | 582 |
| 22 | | |
| 23 | | |
| 24 | | |
| 25 | 1884 | 1410 |
| 26 | 1620 | 1190 |

This shows that without dilution after an extended period of time the biochemical reaction is essentially killed off.

The following is a run similar to Runs 1, 2 and 3 of Example III compared with a similar run wherein the effluent from the process is used for dilution. Results are given in terms of SCOD, soluble chemical oxygen demand, equal to about 90% of TOD.

TABLE III

| | Rates | | | SCOD, mg/l | | |
|---|---|---|---|---|---|---|
| Run | Raw Feed | ml/min Dilution | g pd/ sq.ft. of Raw Feed | Diluted Feed to Biotreater | Effluent | Dilution |
| 1 | 40 | 41 | 0.72 | 1110 | 447 | Tap water |
| 2 | 40 | 43 | 0.72 | 2216 | 2152 | Effluent |

This shows that dilution with the effluent kills the biochemical reaction with the particular feed utilized herein. These runs are both made at a relatively high feed rate and with the feed inherently having a relatively high toxin content. Dilution with effluent can be utilized with feed water having low toxin content. The value of 2216 for the feed of the control Run 2 is simply about the same as the raw feed which has an SCOD of approximately 2200. When the effluent is first introduced as diluent, it would contain an SCOD of approximately 447 as in Run I to give a total feed SCOD of approximately 1500 based on the original feed rate but as the toxic effect of the recycle takes effect the biochemical reaction is essentially killed and the SCOD of the diluted feed approaches the SCOD of the raw feed.

EXAMPLE V

The following runs were carried out in a 5-foot diameter, 7-foot high stainless steel biotreater tank, jacketed to permit temperature control at near 80° F. (27° C.). Air was continuously introduced through three pipes discharging just below a mixer which provided good aeration of the tank contents for the bacterial metabolism. Discharge liquid passed from the bottom of the tank to an adjoining clarifier consisting of a 20-inch diameter, 7-foot tall vertical tank with cone-shaped bottom.

The waste water feed was derived from a butadiene plant using oxidative dehydrogenation of butenes such as shown in U.S. Pat. No. 3,646,239. Typically, the feed water had a pH of about 3.0. Nutrients consisting of 5 parts nitrogen in the form of $NH_3$ and 1 part phosphorus in the form of $H_3PO_4$ per 100 parts by weight of COD in the feed water were continuously added. Caustic soda at rates up to about 5 parts per 100 parts of COD was also added on an intermittent basis to control biotreater pH at about 7.0.

Bacteria were obtained from a commercial biotreater operating in an oil refinery, using samples of recycle sludge. The bacteria were considered to be a mixed population, i.e., a mixture of strains as used in commercial biotreaters. Nalco 634, a commercial flocculating agent sold by Nalco Chemical Company was added to the clarifier to provide a concentration of 10 ppm to accelerate sludge settling. The clarifier effluent filter was a mixed media filter composed of 4–6 inches (depth) of 20–30 mesh sand and 30–36 inches of coarse anthracite coal, operated downflow. The bachwash was to the biotreater tank. The results are shown hereinbelow in Table V.

TABLE V

| Test Run | With Filter (Backflushed daily) | Without Filter |
|---|---|---|
| Run Duration, days | 40 | 19 |
| Retention time in biotreater, days | 2.0 | 2.1 |
| Dilution Rate, gal/hr | none | none |
| Feed Rate, gal/hr | 16.4 | 14.6 |
| Feed Water Composition, | | |
| SCOD*, mg/l | 2370 | 2200 |
| SBOD*, mg/l | 1200 | 1200 |
| Clarifier Effluent Composition, | | |
| SCOD, mg/l | 241 | 400 |
| SBOD, mg/l | 12 | 50 |
| Biotreater Solids, | | |
| VSS, mg/l | 3180 | 2800→1200 |
| SVI | 83 | 25 |
| Clarifier Solids, | | |
| TSS, mg/l | 52 | 300 |
| Filtrate Solids, | | |

TABLE V-continued

| Test Run | With Filter (Backflushed daily) | Without Filter |
|---|---|---|
| TSS, mg/l | 9 | — |

*The material constituting the oxygen demand is completely soluble or so nearly so that the COD and SCOD are essentially the same as are the BOD and SBOD. The additional COD and BOD imposed on the effluent by the presence of solids (microorganisms) in the clarifier effluent if it is sufficient to raise the COD and BOD (i.e. total COD and total BOD) to above acceptible standards may have to be removed, for instance, by settling but one advantage of this second embodiment of the invention is that not only does the backflush improve biotreater efficiency so that the effluent SCOD and SBOD are low but also there is less solid materials adding oxygen demand.
SCOD - Soluble COD
SBOD - Soluble BOD
VSS - Volatile Suspended Solids
TSS - Total Suspended Solids
SVI - Sludge Volume Index, ml of settled sludge after 30 minutes settling per gm. dry sludge.

As can be seen, the use of the backwash of the invention results in improved (lower) effluent SCOD and SBOD as a result of avoiding reducing the Biotreater VSS and is easily capable of producing water meeting the requirement of 20 or less BOD.

While this invention has been described in detail for the purpose of illustration, it is not to be construed as limited thereby but is intended to cover all changes and modifications within the spirit and scope thereof.

We claim:

1. A method comprising:
   passing industrial waste water containing predominately soluble organic industrial waste to a biochemical treatment zone wherein said industrial waste water is treated in a biological treatment zone by an activated sludge process utilizing aerobic bacteria, passing an effluent from said biological treatment zone to a clarifier zone and recycling sludge from said clarifier to said biological treatment zone;
   withdrawing a water stream containing some microorganisms from an upper portion of said clarifier zone and passing said water stream to a filtration zone;
   withdrawing a purified water stream from said filtration zone;
   passing a portion of said purified water stream into contact with activated carbon and then back to said biochemical treatment zone as dilution water, thereby maintaining biological activity in said biological treatment zone; and
   discharging the remainder of said purified water stream without activated carbon treatment;
   wherein the ratio of said industrial waste water to dilution water is within the range of 1:1 to 1:4.

2. A method according to claim 1 wherein said activated carbon is given an exposure within the range of 0.2 to 0.4 grams COD per gram carbon.

3. A method according to claim 1 wherein said industrial waste water has a COD of greater than 1000 mg/liter, over 50 percent of the material creating said COD being soluble in said water.

4. A method according to claim 1 wherein said waste water is the effluent from an oxidative dehydrogenation process and wherein greater than 90 percent of the material creating said COD is soluble in water.

5. A method according to claim 1 wherein a ratio of said industrial waste water:dilution water is within the range of 1:1 to 1:2.

6. A method according to claim 1 wherein said industrial waste water has a COD of greater than 1,000 and said purified water discharge has a COD of less than 200 grams/liter and a BOD of less than 20 grams/liter.

7. A method according to claim 1 wherein a ratio of said industrial waste water:dilution water is within the range of 1:1 to 1:2, said carbon is given an exposure of 0.2 to 0.4 gram COD/gram carbon and said contact with said carbon is carried out at a rate of 1 to 10 volumes of purified water per volume of said activated carbon per hour, said activated carbon having a particle size of 12 by 40 mesh.

8. A method comprising:
   passing industrial waste water to a biochemical treatment, wherein said biochemical treatment involves the use of gram negative bacteria with sludge recycle and said waste water is effluent from an oxidative dehydrogenation process;
   withdrawing a purified water stream from said biochemical treatment;
   passing a portion thereof into contact with activated carbon at the rate of 1 to 10 volumes of waste water per volume of said activated carbon per hour, said activated carbon having a particle size of 12 to 40 mesh, and then passing said portion of the purified water stream back to said biochemical treatment as dilution water, the ratio of said industrial waste water:dilution water being within the range of 1:1 to 1:2; and
   discharging the remainder of said purified water stream without activated carbon treatment.

9. A process comprising:
   passing industrial waste water containing predominately soluble organic industrial waste to a biological treatment zone of a biochemical treatment system using activated sludge, passing an effluent from said biological treatment zone to a clarifier zone and recycling sludge from said clarifier to said biological treatment zone;
   withdrawing a water stream containing some microorganisms from an upper portion of said clarifier zone and passing said water stream to a filtration zone;
   withdrawing a purified water stream from said filtration zone;
   periodically backwashing through said filtration zone to return microorganisms from said filtration zone to said activated sludge system; and
   passing a portion of said purified water stream through an activated carbon filter and returning it to said biological treatment zone as dilution water, thereby maintaining biochemical activity in said biochemical treatment system, the ratio of said industrial waste water to dilution water being within the range of 1:1 to 1:4.

10. A method according to claim 9 wherein said activated sludge process utilizes aerobic bacteria.

11. A method according to claim 10 wherein said filter media is made up of anthracite coal, sand and garnet.

12. A method according to claim 9 wherein said filtration zone is made up of a filter media of at least one of anthracite coal, sand and garnet.

13. A method according to claim 9 wherein said industrial waste water has a COD of greater than 1000 mg/liter, over 50 percent of the material creating said COD being soluble in said waste water.

14. A method according to claim 9 wherein said waste water is the effluent from an oxidative dehydrogenation process and wherein greater than 90 percent of the material creating said COD is soluble in said waste water.

15. A method according to claim 9 wherein said biochemical treatment involves the use of gram negative bacteria and said waste water is effluent from an oxidative dehydrogenation process, said process being carried out at ambient temperature.

16. A method according to claim 9 wherein said backwashing is carried out once every 12 to 36 hours.

17. A method according to claim 9 wherein said industrial waste water has a COD of greater than 1000 mg/liter and said purified water discharge has a BOD of less than 20 mg/liter.

18. A method according to claim 9 wherein said filtration zone is backflushed to said biological treatment zone.